March 28, 1972 J. R. GENSHEIMER Re. 27,318

DOCK FENDER

Original Filed March 30, 1964

INVENTOR.
Joseph R. Gensheimer
BY
Ralph Hammar
Attorney

United States Patent Office

Re. 27,318

Reissued Mar. 28, 1972

27,318

DOCK FENDER

Joseph R. Gensheimer, Erie, Pa., assignor to Lord Corporation, Erie, Pa.

Original No. 3,172,268, dated Mar. 9, 1965, Ser. No. 356,364, Mar. 30, 1964, which is a continuation-in-part of Ser. No. 140,036, Sept. 22, 1961. Application for reissue Sept. 25, 1970, Ser. No. 75,796

Int. Cl. E02b *3/22;* F16f *7/12*

U.S. Cl. 61—48 6 Claims

Matter enclosed in heavy brackets [ ] appears in the original patent but forms no part of this reissue specification; matter printed in italics indicates the additions made by reissue.

*ABSTRACT OF THE DISCLOSURE*

*A fender extends along and is spaced in front of and presented to an edge of a dock and has means supporting the same for movement toward and away from and along the dock. A plurality of mountings are spaced along and extend between the fender and the edge of the dock and each comprises a generally horizontally extending body of elastomer in the form of a column having length, width and thickness. Each body is arranged with its width extending along the edge of the dock and its length extending out from the edge of the dock. A plate is fastened to each end of the body with one plate being attached to the fender and the other to the edge of the dock. The greater ratio of the length to the minimum width and of the length to the minimum thickness is at least substantially two whereby the body will sustain load from the fender in compression until the load reaches a threshold and will thereafter buckle with further deflection without a substantial increase in load.*

This invention is a dock fender which dissipates a large percentage of the energy of impact so a vessel is able to remain close alongside after impact. This reduces the load on the dock. It also facilitates berthing.

Figure 1:
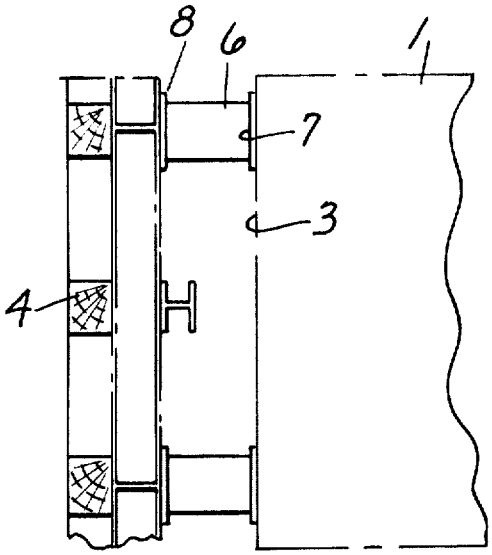
Figure 2:
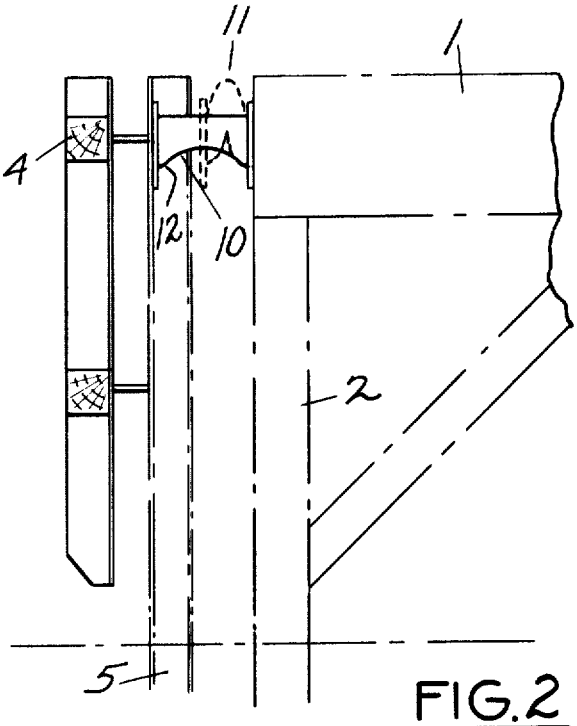
Figure 4:
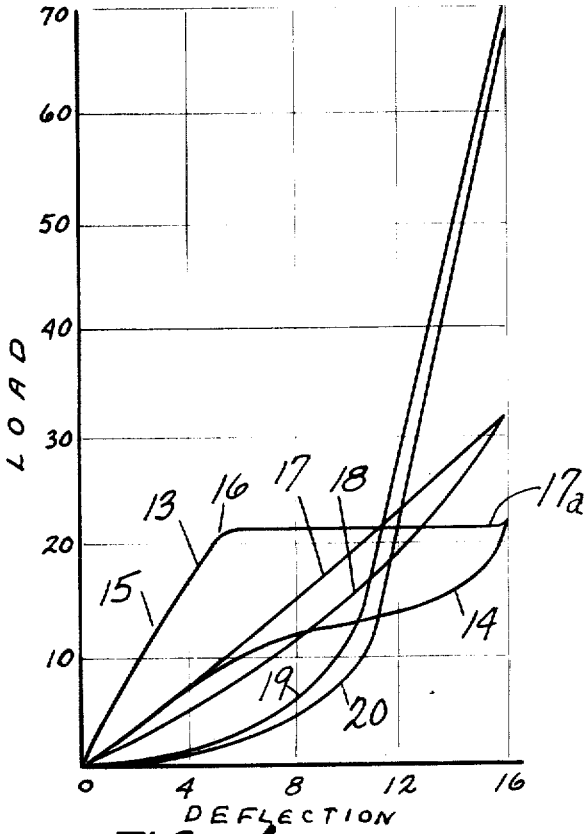
Figure 3:
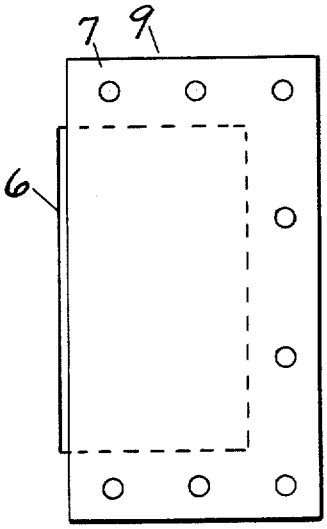

In the drawing, FIG. 1 is a top plan view of a dock fender construction, FIG. 2 is a side elevation, FIG. 3 is an end view of one of the mountings, and FIG. 4 is a comparative performance diagram for various types of mountings.

In the drawing, 1 indicates a portion of a dock supported by suitable piling 2 and 4 indicates a fender spaced in front of one edge 3 of the dock and supported by piling 5. The fender received the initial impact of the vessel and distributes the impact beyond the area of actual contact. The parts so far described are or may be of common construction.

Between the fender 4 and the adjacent edge 3 of the dock are suitably distributed resilient mountings, each of which comprises a body 6 of suitable elastomer in the form of a column having length, width and thickness, said body being arranged with its width extending along said edge of the dock with its length extending out from said edge of the dock and said body being bonded or otherwise fixed at opposite ends to plates 7 and 8. As shown more clearly in FIG. 3, the plates are larger than the ends of the body 6 so there is a projecting flange 9 at the sides and bottom by which the mounting is attached to the fender and dock. In plain view, the body 6 is of generally rectangular outline with the length to width ratio such that it does not buckle laterally under load. In edge view, as shown in FIG. 2, the underside of the body has its center section 10 arched upward. The thickness of the center section is so related to the length of the body 6 that under load the body first takes considerable force in compression and then, at a predetermined load, buckles vertically upward and ultimately assumes the shape indicated in dotted lines at 11. Because the rubber is lifted in buckling, additional energy is stored. Not only does the arched section 10 produce the buckling action due to the length to thickness ratio, but it also results in enlarged end sections 12 for bonding to the plates 7 and 8.

For small impacts, the mountings are quite stiff as the elastomer is stressed in compression. For larger impacts exceeding the threshold stress at which buckling takes place, the bodies 6 buckle upwardly with little or no change in load until reaching the dotted line position indicated at 11. At this point, the bodies become stiff because the load is again taken in compression. Upon release of the pressure against the fender 4, the bodies 6 return to the initial position, but a substantial amount of the stored energy is dissipated and is not recovered. This effect is illustrated in FIG. 4. In this figure, load represents the force transmitted to the dock and deflection represents the motion of the bodies 6. 13 indicates the load deflection curve as load is applied and 14 indicates load deflection curve as the load is released and the energy stored in the mountings is returned from the mounting to the fender. As load is applied, the force follows line 15 until it reaches the threshold or buckling point 16. Continued application of the load results in further strain or deflection without substantial increase in the load. Upon reaching the maximum deflection position 11 for which the mountings are designed, the load starts to increase rapidly, as indicated at 17a, and the load would increase still more rapidly if the load were continued. It will be noticed that the recovery or rebound curve 14 is substantially below the load curve 13. The substantial area between the curves 13 and 14 represents energy absorbed or dissipated in the mountings. The design accomplishes two distinct effects with respect to creep or cold flow. During the relatively long periods when the elastomer is not deflected by a force in the fender, the weight of the elastomer itself will cause a gradual downward deflection of the midsection of the mounting. However, during use, when the elastomer is under considerable stress, it bends or buckles upward due to the design features described. These two forms of cold flow cancel each other, that is, with the design described, the static, downward creep is cancelled by the creep during actual use, when the elastomer is deflected upward, and this upward, dynamic creep is eliminated by the gravitational forces which cause downward curvature. One result of this design is, consequently that an elastomer providing greater hysteresis or damping can be used without the objectionable effect of the high creep usually associated with such compounds in other known designs. By way of comparison, 17 and 18 indicate the load and rebound curves for a mounting of the same deflection in which the stress is taken entirely by shear and 19 and 20 are the load and rebound curves for a mounting in which the load is taken entirely in compression. From these curves, it can be seen that a materially greater amount of energy is absorbed by the present mountings than in mountings in which the load is taken in shear or compression. Not only is the energy absorption greater, but the energy absorption is obtained at a lower maximum load on the dock.

A frequently used figure of merit is the ratio of energy absorbed in foot pounds to the maximum load on the dock. For the mountings of this invention, this figure of merit approaches and even exceeds unity. For compression and shear mountings having similar travel and similar space requirements, this figure of merit would be much less, e.g. from ½ to ⅛.

Any suitable elastomer may be used for the mounting, for example a body of natural rubber with a coating or skin of neoprene for weather resistance.

The body 6 of elastomer behaves as a buckling column, sustaining the load initially in compression and buckling when the load exceeds a threshold. While theoretical formulas have been derived, the practical use requires empirical constants which apply for the ranges of sizes and loads for which the empirical data was obtained so that in engineering practice empirical formulas are generally used. For elastomers, such as natural and synthetic rubbers, buckling takes place when the length is double or more than double the minimum thickness *or width*. It is the ratio of the length to the minimum thickness *or width* which determines the load at which buckling starts. When the mounting has an annular body of elastomer, the minimum wall thickness *and/or width* is measured radially or normal to the length. In the case of a perfectly cylindrical body of elastomer, the thickness *and/or width* is the diameter and the minimum thickness *and/or width* is then also the maximum thickness *and/or width*. The ratio at which buckling takes place is not affected significantly by the shape of the body. As a matter of engineering design, the ratio of length to minimum thickness *or width* is frequently larger than two. Ratios in the vicinity of four are common and ratios as high as seven or more have been used. The bodies having the larger ratios start to buckle at lower loads and have greater travel in the buckling mode with resulting greater energy absorption. These ratios of length to minimum thickness *or width* are defined in the claims as "at least substantially two" with the understanding that the term "two" is approximate.

This is a continuation-in-part of my application Ser. No. 140,036, filed Sept. 22, 1961, now abandoned.

What is claimed as new is:

1. In a dock, a fender extending along and spaced in front of and presented to an edge of the dock, a row of piles supporting the fender, a plurality of mountings spaced along and extending between the fender and said edge of the dock, each of said mountings comprising a body of elastomer in the form of a column having length, width and thickness, said body being arranged with its width extending along said edge of the dock with its length extending out from said edge of the dock, said body being of rectangular plan with a plate bonded to each end and with one plate attached to the fender and the other plate attached to said edge of the dock, said body sustaining the load from the fender toward the *dock* in compression until the load reaches a threshold and thereafter buckling with further deflection without substantial increase in load, [the length to minimum width ratio being such that the body does not buckle laterally under said load,] the underside of the body being arched upward, and the length to minimum thickness ratio being at least substantially two *and greater than the length to minimum width ratio* such that the body [buckles] *will not buckle laterally under said load but will buckle* upwardly under said load.

2. In a dock, a fender extending along and spaced in front of and presented to an edge of the dock, a row of piles supporting the fender, a plurality of mountings spaced along and extending between the fender and said edge of the dock, each of said mountings comprising a generally horizontal body of elastomer in the form of a column having length, width and thickness, said body being arranged with its width extending along said edge of the dock with its length extending out from said edge of the dock, said body having a plate attached to each end of the body and with one plate attached to the fender and the other plate attached to said edge of the dock, said body sustaining the load from the fender toward the dock in compression until the load reaches a threshold and thereafter buckling with further deflection without substantial increase in load, [the length to minimum width ratio being such that the body does not buckle laterally under load,] the underside of the body being arched upward, and the length to minimum thickness ratio being at least substantially two *and greater than the length to minimum width ratio* such that the body [buckles] *will not buckle laterally under said load but will buckle* upwardly under *said* load.

3. In a dock, a fender extending along and spaced in front of and presented to an edge of the dock, a plurality of mountings spaced along and extending between the fender and said edge of the dock, each of said mountings comprising a generally horizontal extending body of elastomer in the form of a column having length, width and thickness, said body being arranged with its width extending along said edge of the dock with its length extending out from said edge of the dock, a plate fastened to each end of the body with one plate attached to said edge of the dock, said body sustaining the load from the fender toward the dock in compression until the load reaches a threshold and thereafter buckling with further deflection without substantial increase in load, [the length to minimum width ratio being such that the body does not buckle laterally under load, and] the length to minimum thickness ratio being at least substantially two *and greater than the length to minimum width ratio* such that the body [buckles] *will not buckle laterally under said load but will buckle* vertically under *said* load.

4. In a dock, a fender extending along and spaced in front of and presented to an edge of the dock, a row of piles supporting the fender, a plurality of mountings spaced along and extending between the fender and said edge of the dock, each of said mountings comprising a body of elastomer in the form of a column having length, width and thickness, said body being arranged with its width extending along said edge of the dock with its length extending out from said edge of the dock, said body being arranged substantially in a horizontal position[.], with a plate bonded to each end and with one plate attached to the fender and the other plate attached to said edge of the dock, [the ratio of the length to the minimum width and] the ratio of the length to the minimum thickness being [such that the greater ratio is] at least substantially two *and greater than the length to minimum width ratio,* [said body sustaining the load from the fender toward the dock in compression until the load reaches a threshold and thereafter buckling with further deflection without substantial increase in load,] said body being contoured so that sections on vertical planes, parallel to the [side] *end* plates form rectangles, the rectangular sections near the center between the end plates having their centers of area higher than the centers of area of sections nearer the [side] *end* plates[.], *said body sustaining the load from the fender toward the dock in compression until the load reaches a threshold and thereafter buckling vertically upward with further deflection without substantial increase in load.*

5. In a dock, a fender extending along and spaced in front of and presented to an edge of the dock, means for supporting the fender for movement toward and away from and along the dock, a plurality of mountings spaced along and extending between the fender and said edge of the dock, each of said mountings comprising a body of elastomer in the form of a column having length, width and thickness, said body being arranged with its width extending along said edge of the dock with its length extending out from said edge of the dock, said body being arranged substantially in a horizontal position, with a plate bonded to each end and with one plate attached to the fender and the other plate attached to said edge of the dock, [the ratio of the length to the minimum width and] the ratio of the length to the minimum thickness being [such that the greater ratio is] at least substantially two *and greater than the length to minimum width ratio,* [said body sustaining the load from the fender toward the dock in compression until the load reaches a threshold and thereafter buckling with further deflection without substantial increase in load,] said body being contoured so that sections on vertical planes, parallel to the [side] *end* plates form rectangles, the rectangular sections near the center between the end plates having their centers of area higher than the centers of area of sections nearer the [side] *end plates*[.], *said body sustaining the load from the fender toward the dock in compression until the load reaches a threshold and thereafter buckling vertically upward with further deflection without substantial increase in load.*

6. In a dock, a fender extending along and spaced in front of and presented to an edge of the dock, means for supporting the fender for movement toward and away from and along the dock, a plurality of mountings spaced along and extending between the fender and said edge of the dock, each of said mountings comprising a generally horizontally extending body of elastomer in the form of a column having length, width and thickness, a plate fastened to each end of the body with one plate attached to the fender and the other plate attached to said edge of the dock, said body sustaining the load from the fender toward the dock in compression until the load reaches a threshold, the ratio of the length to the minimum width and the ratio of the length to the minimum thickness being such that the greater ratio is at least substantially two and the body buckles at loads above said threshold with further deflection and without substantial increase in load.

References Cited

The following references, cited by the Examiner, are of record in the patented file of this patent or the original patent.

UNITED STATES PATENTS

| | | | |
|---|---|---|---|
| 2,597,878 | 5/1952 | Lee | 248—358 |
| 2,622,836 | 12/1952 | Lee | 248—358 |
| 2,655,005 | 10/1953 | Kinneman | 61—48 |
| 2,713,483 | 7/1955 | Tillou | 213—40 |

FOREIGN PATENTS

| | | | |
|---|---|---|---|
| 1,256,498 | 1961 | France | 267—63 |
| 736,733 | 1955 | Great Britain | 267—63 |
| 886,708 | 1962 | Great Britain | 267—63 |

JACOB SHAPIRO, Primary Examiner

U.S. Cl. X.R.

248—358; 267—63, 140, 141